United States Patent
Zhang et al.

(10) Patent No.: US 11,703,584 B2
(45) Date of Patent: Jul. 18, 2023

(54) DEVICE AND METHOD FOR DETERMINING THE INITIAL DIRECTION OF MOVEMENT OF AN OBJECT IN THE DETECTION RANGE OF A MOTOR VEHICLE RADAR SENSOR

(71) Applicant: Conti Temic microelectronic GmbH, Nuremberg (DE)

(72) Inventors: Yang Zhang, Friedrichshafen (DE); Andreas Kramer, Opfenbach (DE); Andreas Eisenbarth, Hergatz (DE)

(73) Assignee: Conti Temic microelectronic GmbH

( * ) Notice: Subject to any disclaimer, the term of this patent is extended or adjusted under 35 U.S.C. 154(b) by 1040 days.

(21) Appl. No.: 16/084,661

(22) PCT Filed: Feb. 14, 2017

(86) PCT No.: PCT/DE2017/200017
§ 371 (c)(1),
(2) Date: Sep. 13, 2018

(87) PCT Pub. No.: WO2017/157393
PCT Pub. Date: Sep. 21, 2017

(65) Prior Publication Data
US 2019/0072658 A1  Mar. 7, 2019

(30) Foreign Application Priority Data
Mar. 14, 2016  (DE) .................... 10 2016 204 113.4

(51) Int. Cl.
*G01S 13/58* (2006.01)
*G01S 13/72* (2006.01)
(Continued)

(52) U.S. Cl.
CPC .......... *G01S 13/589* (2013.01); *G01S 7/2955* (2013.01); *G01S 13/726* (2013.01); *G01S 13/931* (2013.01);
(Continued)

(58) Field of Classification Search
CPC .... G01S 13/589; G01S 7/2955; G01S 13/726; G01S 13/931; G01S 2013/932;
(Continued)

(56) References Cited

U.S. PATENT DOCUMENTS 8,818,703 B2 * 8/2014 Harada ............... B60R 21/0134
701/301
9,483,948 B1 * 11/2016 Gordon ................. B60W 30/00
(Continued)

FOREIGN PATENT DOCUMENTS

DE    102006006983    8/2007
DE    102013111841    4/2014
(Continued)

OTHER PUBLICATIONS

International Search Report of the International Searching Authority for International Application PCT/DE2017/200017, dated May 17, 2017, 3 pages, European Patent Office, HV Rijswijk, Netherlands.
(Continued)

*Primary Examiner* — Matthew M Barker
(74) *Attorney, Agent, or Firm* — RatnerPrestia (57) ABSTRACT

An estimated initial direction of movement of a newly-detected object is to be determined. The actual previous directions of movement and positions of previously-detected objects are determined and stored. When a newly-detected object is newly detected at a certain position, then the actual previous direction of movement of one of the previously-detected objects at that position is used as a basis to
(Continued)

determine the estimated initial direction of movement of the newly-detected object at that position.

16 Claims, 3 Drawing Sheets

(51) Int. Cl.
*G01S 13/931* (2020.01)
*G01S 7/295* (2006.01)

(52) U.S. Cl.
CPC .............. *G01S 2013/932* (2020.01); *G01S 2013/93271* (2020.01); *G01S 2013/93272* (2020.01); *G01S 2013/93273* (2020.01)

(58) Field of Classification Search
CPC .......... G01S 2013/93273; G01S 13/58; G01S 13/66; G01S 2013/93271; G01S 2013/93272
See application file for complete search history.

(56) References Cited

U.S. PATENT DOCUMENTS

| | | |
|---|---|---|
| 2005/0264438 A1 | 12/2005 | Fullerton et al. |
| 2008/0300787 A1* | 12/2008 | Zeng ............... G01S 7/4026 701/301 |
| 2011/0175767 A1 | 7/2011 | Tsunekawa |
| 2013/0218398 A1 | 8/2013 | Gandhi et al. |
| 2014/0118187 A1 | 5/2014 | Nakagawa |
| 2015/0130643 A1 | 5/2015 | Nagy |
| 2015/0301171 A1* | 10/2015 | Noyes ............... G01S 13/22 342/113 |
| 2015/0353083 A1* | 12/2015 | Hasberg ............... G06T 11/203 701/1 |

FOREIGN PATENT DOCUMENTS

| | | |
|---|---|---|
| DE | 102013011239 | 1/2015 |
| EP | 1 418 444 | 5/2004 |
| JP | 2001-337161 A | 12/2001 |
| JP | 2009-059082 A | 3/2009 |
| JP | 2009-109293 A | 5/2009 |
| JP | 2011-158417 A | 8/2011 |
| JP | 2014-089058 A | 5/2014 |
| WO | WO 2010/073292 | 7/2010 |

OTHER PUBLICATIONS

PCT International Preliminary Report on Patentability including English Translation of PCT Written Opinion of the International Searching Authority for International Application PCT/DE2017/200017, dated Sep. 18, 2018, 9 pages, International Bureau of WIPO, Geneva, Switzerland.

German Search Report for German Patent Application No. 10 2016 204 113.4, dated Sep. 23, 2016, 7 pages, German Patent and Trademark Office, Muenchen, Germany, with partial English translation, 5 pages.

Partial English Summary of Japanese Office Action in Japanese Patent Application No. 2018-541676, dated Dec. 9, 2020, 3 pages.

* cited by examiner

DEVICE AND METHOD FOR DETERMINING THE INITIAL DIRECTION OF MOVEMENT OF AN OBJECT IN THE DETECTION RANGE OF A MOTOR VEHICLE RADAR SENSOR

FIELD OF THE INVENTION

The present invention relates to a device and a method for detecting an object. In particular, the present invention relates to an initial estimation of a direction of movement of a detected object.

BACKGROUND INFORMATION

Modern vehicles increasingly have a multiplicity of systems which support a driver during the operation of his vehicle or, if necessary, make possible completely autonomous driving. Among other things, it is necessary to detect objects, in particular further vehicles, in the surroundings of the ego vehicle. In addition to purely detecting objects in the vehicle surroundings, a direction of movement of such detected objects relative to the ego vehicle is also of great interest. Among other things, radar sensors are also used to detect objects in the vehicle surroundings.

If an object is detected for the first time by means of such a radar sensor, determining the direction of movement of such an object which has been detected for the first time constitutes a major challenge. Since no information regarding the history of the object, in particular regarding previous positions, is known when a new object is detected for the first time, the direction of movement of such an object has to initially be estimated. One possible approach here is to initially allocate a fixed initial direction of movement to all of the newly detected objects. However, this initial direction of movement can differ from the actual direction of movement of the detected object. In the event of such a discrepancy, the direction of movement of the detected object can be gradually corrected over time and thus approaches the actual direction of movement. However, a period of time of varying lengths can pass before the calculated direction of movement corresponds to the actual direction of movement, during which time a discrepancy exists between the calculated and actual directions of movement.

As long as the calculated direction of movement of a detected object does not correspond to the correct direction of movement, there is a risk that the calculated direction of movement of the detected object will result in inconsistencies in the control system of the ego vehicle. If, for example, it is assumed in the case of a newly detected object that—contrary to the actual direction of movement—it is moving towards the ego vehicle, this may possibly result in the control system of the ego vehicle setting off an alarm, which might possibly lead to an evasive maneuver or a braking operation, although no hazardous situation exists in reality.

There is therefore a need for a reliable detection of objects which makes it possible to estimate movement as precisely as possible during the detection of new objects.

SUMMARY OF THE INVENTION

To this end, the present invention, according to a first aspect, provides a device for detecting an object, and according to another aspect, provides a method of detecting an object.

Accordingly, the following is provided:

A device for detecting an object having a detection unit, a memory and a computing unit. The detection unit is designed to detect an object in a detection range of the detector unit and establish a position of the detected object in the detection range. The memory is designed to store information regarding a position in the detection range and a direction of movement of objects detected previously, which corresponds to this position. The computing unit is designed to calculate an initial direction of movement of the object detected by the detection unit. The initial direction of movement of the detected object is, in this case, calculated using the information stored in the memory.

The following is additionally provided:

A driver assistance system having a device for detecting an object according to the invention.

The following is furthermore provided:

A method for detecting an object, having the steps of providing information regarding a position and a corresponding direction of movement of an object detected previously in a detection range of a detection unit, and detecting another object in the detection range of the detection unit. The method additionally comprises the steps of establishing a position of the detected further object in the detection range of the detection unit as well as determining a direction of movement of an object detected previously at the established position of the detected further object on the basis of the information provided regarding the position and the saved direction of movement of objects detected previously, which corresponds to this position. Finally, the method comprises a step for allocating an initial direction of movement to the detected further object using the direction of movement of an object detected previously at the established position.

ADVANTAGES OF THE INVENTION

The realization which forms the basis of the present invention is that several objects in the same location of a detection range of a detection unit have, with high probability, an identical or at least similar direction of movement.

Therefore, the idea which forms the basis of the present invention is to take account of this realization and to specify a direction of movement, which has been determined for other objects detected previously at this position, as an initial direction of movement of new objects at identical positions of a detection range of a detection unit comprising a sensor arrangement. By storing and providing directions of movement of other objects detected previously as a function of a position in the detection range of a detection unit, an improved initial direction of movement can consequently be specified for newly detected objects. Compared with an arbitrary initial direction of movement, the discrepancy between the initial direction of movement and the actual direction of movement of a newly detected object is thereby reduced in most cases.

Due to an improved initial direction of movement of a newly detected object, the reliability of the direction of movement of a detected object is consequently increased from the first. The calculated direction of movement of a detected object consequently matches the actual direction of movement of the object considerably more quickly. By way of example, further processing systems such as, for example, a driver assistance system, can, in this way, further process the provided information of the detected object more quickly as reliable, correct information. The risk of a further processing system responding incorrectly by, for example, setting off a false alarm or controlling the vehicle incorrectly, etc. can consequently be reduced.

According to one embodiment, the detector unit comprises a radar sensor. In particular, the initial movement estimation of newly detected objects constitutes a major challenge with radar sensors. Due to the improved movement estimation for newly detected objects, the reliability and accuracy of the information of newly detected objects can consequently be increased, especially with radar sensors.

According to one embodiment, the device for detecting an object comprises a processing unit. The processing unit is designed to determine a movement path through the detection range of the detector unit on the basis of established positions of a detected object. A direction of movement of the object can subsequently be calculated using the movement path in the detection range of the detector unit. The calculated direction of movement of the object through the detection range of the detector unit can subsequently be stored in the memory. In this way, the information regarding the relationship between the position and direction of movement within the detection range of the detector unit can be trained in the device for detecting an object. The information stored in the memory is consequently always up-to-date and can, in each case, be promptly adjusted to changing ambient conditions. On saving new information in the memory, the previously saved information can, in each case, be overwritten. Alternatively, it is also possible to consider, in each case, an average of a plurality of previously stored relationships between the position and direction of movement and, by way of example, to take an average of a predetermined number of previously calculated directions of movement for a respective position. In addition, it is also conceivable, if necessary, that the stored information is valid, in each case, for a predetermined period of time. Following the expiration of the predetermined period of time, this information can be deemed to be invalid and can be disregarded during the initial determination of a direction of movement.

According to another embodiment, the processing unit is designed to calculate the movement path by means of interpolation between an entry point of the detected object into the detection range and an exit point of the detected object from the detection range. By way of example, a linear movement of the detected object can be assumed between the entry point and the exit point. Additional detected positions of an object or a determination of the movement path on the basis of other detected positions of the object are, in addition, equally possible. In addition, more complex interpolations based on quadratic terms or terms of a higher order are likewise possible. In this way, a simple, reliable determination of directions of movement of the detected objects can be made possible.

According to one embodiment, the information stored in the memory regarding the direction of movement of an object detected previously is adjusted using the egomotion of the device for detecting an object. The egomotion of the device for detecting an object can, in this case, be established by means of any suitable sensor technology and/or by using data from other systems such as, for example, a driver assistance system. The stored direction of movement can, in this case, be adjusted regularly, in particular continually.

According to another embodiment, the processing unit calculates a direction of movement, in each case, for a plurality of positions in the detection range of the detector unit. By way of example, the processing unit can calculate a direction of movement, in each case, for discrete positions within the detection range.

According to one embodiment, the memory of the device for detecting an object is designed to save the information regarding the position and the corresponding direction of movement for cells or respectively grid points of a predetermined raster within the detection range of the detector unit.

According to another embodiment, the step for providing information regarding a position and a corresponding direction of movement of the method for detecting an object additionally comprises the steps of determining a movement path of the previously detected object through the detection range of the detector unit and of calculating a direction of movement of the object detected previously at a position in the detection range of the detector unit.

According to another embodiment, the step for determining the movement path of the previously detected object through the detection range of the detector unit includes interpolating the movement path between an entry point of the detected object into the detection range and an exit point of the detected object from the detection range of the detector unit.

An interpolation on the basis of alternative and/or additional detected positions is, in addition, equally possible.

According to another embodiment, the step for calculating a direction of movement of the object detected previously calculates the direction of movement for a plurality of discrete positions of the detection range. By way of example, the discrete positions can be located in a predetermined raster of the detection range.

According to another embodiment, the step for calculating a direction of movement of the object detected previously calculates the direction of movement from directions of movement of a plurality of objects detected previously. In particular, a plurality of objects detected previously, which have each been detected at the identical corresponding position of the detection range of the detector unit, is considered.

According to one embodiment, the direction of movement of the object detected previously is adjusted using an established egomotion. The egomotion of the system which carries out the method according to the invention, in particular of the detector unit used in the process, can be established by means of any sensor technology or using movement data of further systems. The direction of movement of previously established objects can, in this case, be adjusted regularly, in particular continually.

The above configurations and further developments can be combined with one another in any way deemed appropriate. Further configurations, further developments and implementations of the invention also comprise combinations of features of the invention described above or below with respect to the embodiment examples, but which are not explicitly indicated. In particular, the person skilled in the art will also add individual aspects as improvements or supplements to the respective basic form of the present invention.

BRIEF DESCRIPTION OF THE DRAWINGS

The present invention is explained in greater detail below, with reference to the embodiment examples indicated in the schematic figures of the drawing, wherein.

EMBODIMENTS OF THE INVENTION

Unless otherwise indicated, identical elements and devices or respectively elements and devices having an identical function are provided with identical reference numerals in all of the figures.

Figure 1:
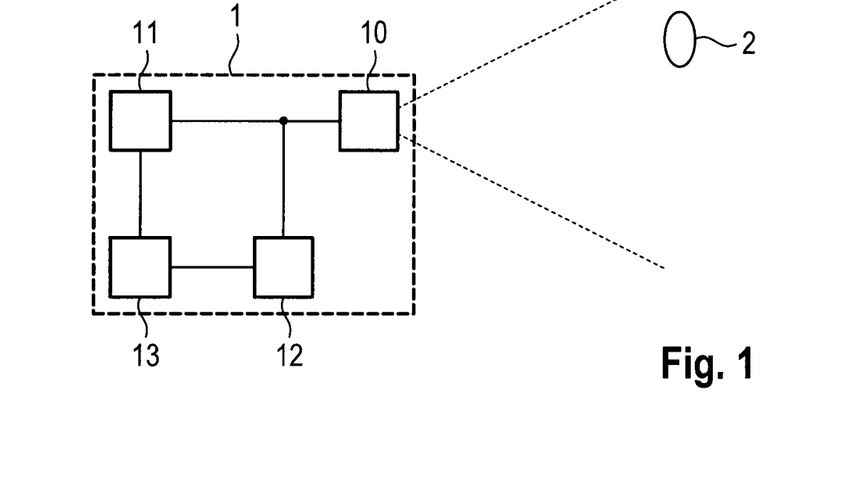
FIG. 1: shows a schematic representation of a device for detecting an object according to one embodiment.

FIG. 1 shows a schematic representation of a device 1 for detecting an object 2 according to one embodiment. The device 1 for detecting an object 2 comprises a detection unit 10, a memory 11 and a computing unit 12. The device 1 for detecting an object 2 can additionally comprise a processing unit 13. The detection unit 10 of the device 1 for detecting an object 2 can, by way of example, comprise a radar sensor. In addition, however, any further sensor units for detecting an object, in particular for detecting an object in the surroundings of the device 1, are also conceivable. The detection unit 10 can detect an object 2 in a predefined region around the device 1. This detection range (characterized by the dashed lines) can, by way of example, comprise a specified angular range in the horizontal and/or vertical direction(s). If the device 1 for detecting an object 2 is, by way of example, provided in a vehicle, the detection unit 10 can, by way of example, detect a specified angular range in front of or respectively behind the vehicle and detect objects in this specified angular range such as, for example, further vehicles or other moving or stationary objects. In addition, it is, however, equally possible that the detection unit 10 monitors the entire surrounding area, i.e. 360° around the device 1 and detects objects in the entire area surrounding the device 1. In particular, the detection unit 10 can also comprise multiple sensors for monitoring the surroundings. In this case, the detection range can, by way of example, be limited to a specified distance from the device 1, in particular to a specified distance from the detection unit 10. By way of example, the detection unit 10 can detect objects 2 up to a distance of 10, 50, 100 m or any other specified distance. In particular, it is also possible that the distance at which objects 2 are detected is variable or respectively adjustable.

If an object 2 in the detection range of the detection unit 10 is detected by the detection unit 10, the detection unit 10 can in particular establish the position of the detected object 2 with respect to the detection unit 10. This establishment of the position of the detected object can comprise, by way of example, an angular position in the azimuth and elevation direction. In addition, the determination of the position can also comprise the establishment of the distance between the detection unit 10 and the object 2. In this way, it is possible to clearly allocate the detected object 2 to a position in the space which corresponds to the detection range of the detection unit 10. If necessary, the position can also be determined in one plane only for the purposes of simplification, wherein the determination of the elevation angle does not, by way of example, also flow into the determination of the position. The established position in the azimuth/elevation angle as well as the distance can, if necessary, also be transformed into a two- or respectively three-dimensional cartesian coordinate system or into any other coordinate system.

After an object 2 has been detected for the first time by the detection unit 10 of the device 1 for detecting an object, the exact position of the detected object 2 can indeed be established by the detection unit 10 for the first time. However, as a rule, when a new object 2 is detected for the first time, no information regarding the direction in which the detected object 2 is moving with respect to the device 1 is initially available.

In order to establish an estimation of the direction of movement of the detected object 2 as rapidly as possible, an initial direction of movement resulting from one or more directions of movement of objects, which have been detected previously at the location of the detection range at which the newly detected object 2 has been detected, can be assigned to the newly detected object 2. To this end, information regarding the position and corresponding direction of movement of objects detected previously can be stored in a memory 11 and provided. This information regarding the position and corresponding direction of movement can, by way of example, be established from the directions of movement of objects detected previously and can be stored in the memory 11. This is explained in even greater detail below.

A computing unit 12 can consequently read out information regarding directions of movement of the objects detected previously from the memory 11. In this case, the computing unit 12 can, in particular, read out a corresponding direction of movement of objects detected previously from the memory 11 for the position at which a new object 2 has been detected by the detection unit 10. This direction of movement of objects detected previously can subsequently be assigned to a newly detected object 2 as an initial direction of movement.

Figure 2:
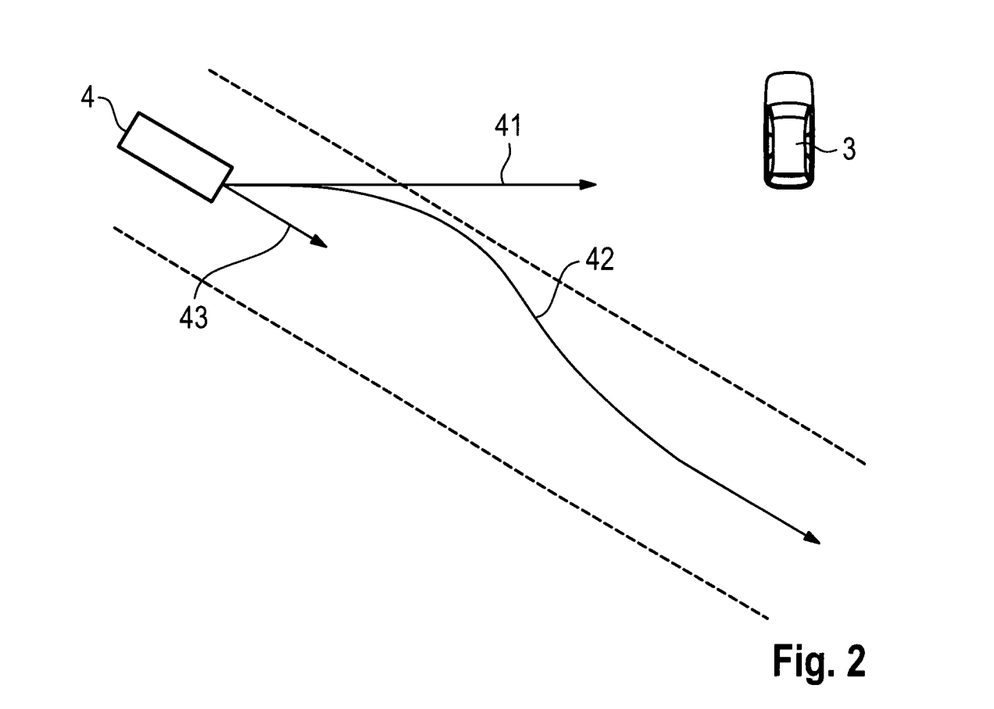
FIG. 2: shows a schematic representation of a movement estimation.

FIG. 2 shows a schematic representation of a movement estimation, in which an initial direction of movement is initially assigned in the conventional manner to a newly detected vehicle 4, without also including the direction of movement of objects detected previously, according to the invention. If, in this case, another object such as, for example, the vehicle 4 is detected by a device 1 for detecting an object 2 in the vehicle 3, an arbitrary fixed direction of movement 41 is initially assigned to this newly detected vehicle 4. By way of example, this direction of movement 41 can involve a standard assumption. A direction of movement toward the ego vehicle 3, as represented here, could be assumed by way of example. However, the result of this would be that a driver assistance system in the ego vehicle 3 could assume that a collision with the newly detected object 4 is to be expected. Only after the vehicle 4 has been observed over a longer period of time does the estimated course of movement 42 of the detected object 4 approach the actual course of movement 43.

Figure 3:
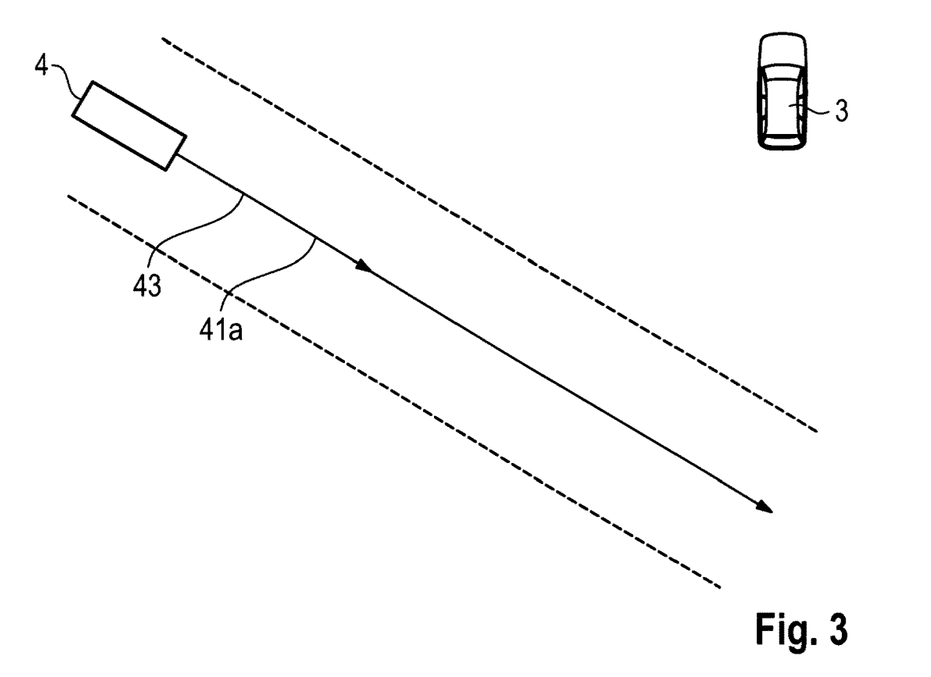
FIG. 3: shows a schematic representation of a movement estimation according to one embodiment.

FIG. 3 then shows a schematic representation of a movement estimation according to one embodiment of the present invention. If, in this case, another object such as, for example, the vehicle 4 is detected by a device 1 for detecting an object 2 in the vehicle 3, a direction of movement 41a corresponding to a direction of movement of objects which have already been detected previously at this position can subsequently be assigned to the newly detected vehicle 4 as an initial direction of movement. If, by way of example, vehicles have already driven past previously in the same direction at an earlier point in time, a direction of movement of vehicles is already known from these vehicles. Therefore, an initial direction of movement 41a corresponding to the actual direction of movement 43 can already be assigned to the vehicle 4 when it is detected for the first time.

Figure 4:
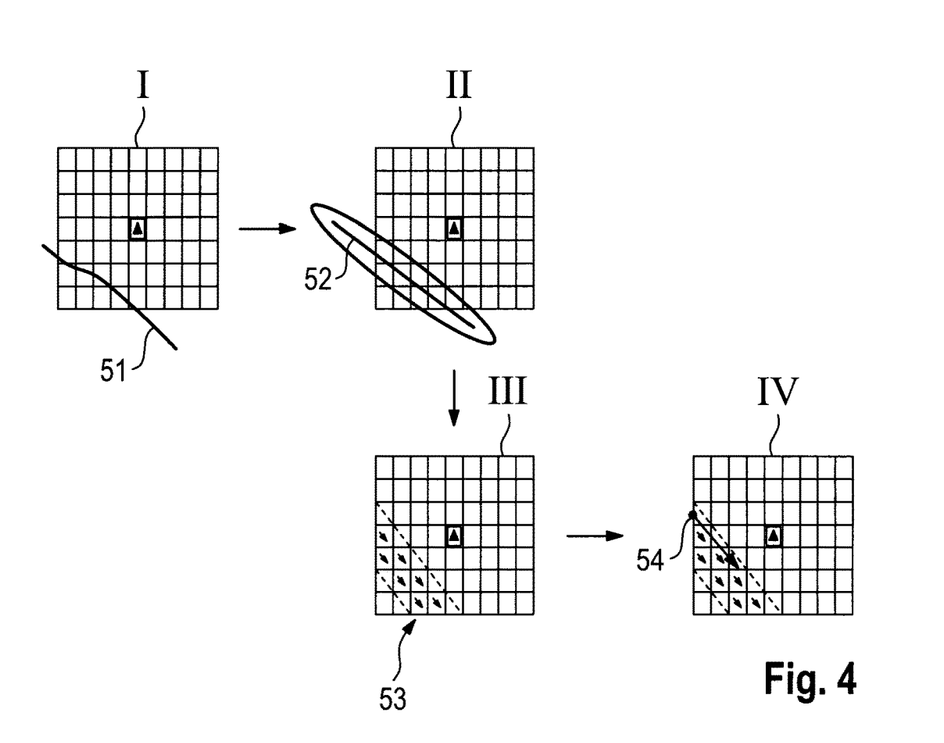
FIG. 4: shows a schematic representation forming the basis of the provision of information regarding the position and direction of movement according to one embodiment.

FIG. 4 shows a schematic representation forming the basis of the determination of directions of movement according to one embodiment. To this end, the detection range of the detection unit 10 can be discretized, by way of example. The detection range of the detection unit 10 can consequently, by way of example, be subdivided into a raster. The resulting grid can have any configuration in accordance with the detection range of the detection unit 10. By way of example, the detection range of the detector unit 10 can be subdivided into a grid having a specified number of lines and a specified number of columns, as represented in partial image I of FIG. 4. If an object 2 is detected in the detection range of the detector unit 10, the movement of this detected object 2 can be detected over the entire period of time, during which the object is located in the detection range of the detection unit 10. After the object 2 has left the detection range of the detection unit 10, the movement path 51 of the detected object 2 can be determined in the detection range. If necessary, as represented in partial image II, the movement of the object 2 in the detection range can then be interpolated. By way of example, the movement between an entry point of the object 2 into the detection range and an exit point from the detection range can be interpolated. However, it is also possible to establish the movement path by means of alternative and/or additional detected positions of an object. To this end, a linear interpolation 52 can be carried out between two points in the simplest scenario. However, any more complex interpolations, in particular interpolations having higher exponential coefficients, are in addition conceivable.

A direction of movement 53 can subsequently be assigned to each cell of the detection range of the detection unit 10, through which the detected object 2 has moved, on the basis of the course of movement thus interpolated, or from the course of movement actually detected, as represented in partial image II. In the case of a linear interpolation of the direction of movement, the identical direction of movement can be assigned, by way of example, to each cell through which the detected object 2 has moved.

During the determination of the course of movement of the detected object 2, a course of movement of the device 1 for detecting an object and, in particular, a course of movement of the detection unit 10 of the device 1 can also be considered. In this way, the course of movement of the detected object 2 can be determined as an absolute course of movement in the surroundings of the device 1 for detecting an object. The course of movement of the device 1 for detecting an object can in the process be detected by means of any suitable sensors. To this end, sensors which are already used in other ways can, in particular, also provide data regarding the course of movement of the device 1 for detecting an object, which data can be enlisted for analyzing the course of movement. If the device 1 for detecting an object is integrated into a vehicle, by way of example, information regarding the course of movement can, for example, also be provided by components of a driver assistance system or similar. The information regarding the course of movement of the device 1 for detecting an object can comprise both components of a translational movement, by way of example a forwards or backwards movement and/or a lateral movement, and a rotational movement (rotary movement).

During the establishment of the direction of movement of the detected object 2, the established direction of movement of the object 2 can be compensated for with respect to the device 1 for detecting an object using the egomotion of the device 1 for detecting an object. To this end, the established egomotion of the device 1 for detecting an object can, by way of example, be subtracted from the established direction of movement of the object 2. In this way, the absolute movement of the detected object 2 in the surroundings can be determined. The compensated movement of the detected object 2 thus established can subsequently be enlisted for further processing. By way of example, the compensated movement can be stored in the memory 11.

It is thus possible, for example, that the direction of movement of the object 2 stored in the memory 11 is regularly, in particular continually, compensated for or respectively updated using the established egomotion of the device 1 for detecting an object.

In this case, the direction of movement can be assigned, by way of example, in angular degrees or degrees of arc to each cell, to which a direction of movement is assigned. Alternatively, it is also possible to scale the established direction of movement to any specified range of values, by way of example between 0 and 1 or between 0 and 255 (8 bits). Depending on the application, the direction of movement can be stored as a direction of movement in a range between 0 and 180 angular degrees. No obvious distinction between objects which are moving towards the detection unit 10 and objects which are moving away from the detection unit 10 is possible in this case. Alternatively, however, it is also possible to store the clear direction of movement in a full circle between 0 and 360°.

Once a new value for a direction of movement of a cell in the detection range has been determined, the previously stored value can, in each case, be overwritten. Alternatively, it is also possible for each cell in the detection range of the detector unit 10 to store a predetermined number of direction values. By way of example, an average can be determined from a predetermined number of previously stored direction of movement values and this average can be assigned to a newly detected object as an initial direction of movement. It is additionally conceivable for a time stamp to be allocated, in each case, to the established values for the direction of movement. In this case, the validity for a value of a direction of movement of previously determined directions of movement can be rejected after a predetermined time so that, if necessary, outdated determinations for a direction of movement are not enlisted as a basis for allocating new directions of movement.

Once a direction of movement has been assigned to one or more cells in the detection range of the detector unit 10 on the basis of detected objects 2, as represented in partial image III, an initial direction of movement can subsequently be assigned in a simple manner during the detection of another new object 2 in the detection range of the detection unit 10, as represented for example in partial image IV. To this end, a direction of movement 54 is read out from the previously established and saved directions of movement, said direction of movement corresponding to the direction of movement at the position at which the new object 2 has been detected. This direction of movement for the position of the newly detected object 2 is subsequently assigned to the newly detected object 2 as an initial direction of movement.

Figure 5:
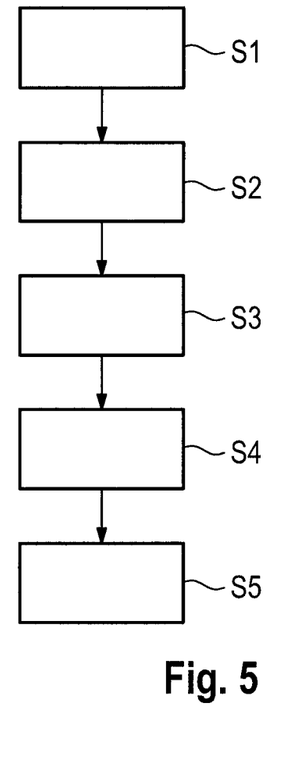
FIG. 5: shows a schematic representation of a flow chart forming the basis of a method for detecting an object according to one embodiment.

FIG. 5 shows a schematic representation of a flow chart for a method for detecting an object, which forms the basis of an embodiment. In step S1, information regarding a position and a direction of movement of an object detected previously in a detection range of a detection unit 10, which corresponds to this position, is initially provided. This can be effected, by way of example, as already described above. To this end, a movement path of a previously detected object through the detection range of the detection unit 10 can be determined. A direction of movement of such an object detected previously can subsequently be calculated at a position in the detection range of the detector unit. In particular, the movement path can be calculated on the basis of an entry point of the detected object into the detection range and an exit point of the detected object from the detection range. It is also possible to calculate the movement path on the basis of additional or alternative detected positions of an object. To this end, a linear interpolation is possible, by way of example. The calculation of the direction of movement of an object detected previously can in particular be calculated for a plurality of discrete positions within a predetermined raster in the detection range. The calculation of the direction of movement can, in this case, also be calculated on the basis of a plurality of objects detected previously.

Furthermore, the method according to the invention comprises a step S2 for detecting another object 2 in the detection range of the detector unit 10. A position of the detected further object in the detection range of the detector unit 10 is then established in step S3. A direction of movement of an object detected previously can subsequently be determined in step S4 at the established position of the detected further object 2 on the basis of the information provided. Finally, a direction of movement can subsequently be allocated in step S5 to the detected further object. The direction of movement can, in this case, be allocated using the directions of movement of objects detected previously at the established position.

In summary, the present invention relates to the determination of an improved initial direction of movement of sensor-detected objects. The directions of movement of sensor-detected objects are determined and stored. On the basis of these stored directions of movement of detected objects, an initial direction of movement corresponding to a direction of movement of an object detected previously in the same location can be assigned to a newly detected object in a simple manner.

The invention claimed is:

1. A device for detecting an object, comprising:
a sensor arrangement that comprises at least one sensor and that is configured to detect objects multiple times while traveling through a detection range of the sensor arrangement and to detect a new object in the detection range, the objects being physical objects detected prior to detection of the new object and the new object being a physical object that is detected by the sensor arrangement a single time upon entering the detection range, and to establish previous positions of the objects and a current actual position of the new object in the detection range;
at least one processor configured to compute previous directions of movement of the objects based on the previous positions; and
a memory configured to store information indicating respective previous positions and respective associated previous directions of movement of the objects that have been detected previously at the previous positions in the detection range,
wherein the at least one processor is configured to assign an estimated initial direction of movement of the new object relative to the current actual position thereof based on the previous directions of movement of the objects that have been detected previously at the current actual position of the new object in the detection range and stored in the memory.

2. The device according to claim 1, wherein the at least one sensor comprises a radar sensor.

3. The device according to claim 1, wherein the at least one processor is further configured to determine a movement path through the detection range of the sensor arrangement based on the respective previous positions of the objects that have been detected previously, and to calculate the previous directions of movement based on the movement path and to store the movement path in the memory together and associated with the previous positions.

4. The device according to claim 3, wherein the at least one processor is configured to calculate the movement path by interpolation between at least two of the previous positions of one of the objects that have been detected previously.

5. The device according to claim 3, wherein the at least one processor is configured to calculate the movement direction respectively for a plurality of the previous positions.

6. The device according to claim 1, wherein the memory is configured to store the information indicating the respective previous positions and respective associated previous directions respectively for grid points of a predetermined raster within the detection range of the sensor arrangement.

7. The device according to claim 1, further configured to adjust the information stored in the memory based on an egomotion of the device.

8. A driver assistance system having a device for detecting an object according to claim 1.

9. The device according to claim 1, wherein the new object is a different object from the objects that have been detected previously.

10. A method comprising:
detecting, by a sensor arrangement that comprises at least one sensor, objects multiple times while traveling through a detection range of the sensor arrangement and a new object in the detection range of the sensor arrangement, the objects being physical objects detected prior to detection of the new object and the new object being a physical object that is detected by the sensor arrangement a single time upon entering the detection range;
establishing, by at least one vehicle processor, previous positions of the objects that have been detected previously in the detection range and a current actual position of the new object in the detection range of the sensor arrangement;
computing, by the at least one vehicle processor, directions of movement of the objects based on the previous positions;
storing, in a memory unit, information indicating respective previous positions and respective associated previous directions of movement of the objects that have been detected previously in the detection range of the sensor arrangement;
assigning, by the at least one vehicle processor, an estimated initial direction of movement of the new object relative to the current actual position thereof based on the previous directions of movement of the previous objects that have been detected previously at the current actual position of the new object in the detection range; and
controlling, by at least one other vehicle processor, movement of a vehicle in response to and dependent on the estimated initial direction of movement of the new object.

11. The method according to claim 10, wherein the step of storing the information comprises the following steps:

determining a movement path of one of the objects detected previously through the detection range of the sensor arrangement; and calculating the previous direction of movement of the one of the objects detected previously at one of the previous positions.

12. The method according to claim 11, wherein the step of determining the movement path comprises interpolating the movement path between at least two of the previous positions of the one of the objects that have been detected previously.

13. The method according to claim 11, wherein the step of calculating the previous direction of movement comprises calculating the previous direction of movement for a plurality of discrete ones of the previous positions within a predetermined raster of the detection range.

14. The method according to claim 11, wherein the step of calculating the previous direction of movement comprises calculating the previous direction of movement from a plurality of previous directions of movement.

15. The method according to claim 11, further comprising adjusting the previous direction of movement of the one of the objects that have been detected previously based on established egomotion.

16. The method according to claim 10, wherein the new object is a different object from the objects that have been detected previously.

* * * * *